(12) United States Patent
Landry

(10) Patent No.: US 7,322,462 B2
(45) Date of Patent: Jan. 29, 2008

(54) CONVEYOR BELT TENSIONER

(75) Inventor: Thomas J. Landry, Spring Lake, MI (US)

(73) Assignee: TGW-Ermanco, Inc., Spring Lake, MI (US)

( * ) Notice: Subject to any disclaimer, the term of this patent is extended or adjusted under 35 U.S.C. 154(b) by 169 days.

(21) Appl. No.: 11/304,472

(22) Filed: Dec. 15, 2005

(65) Prior Publication Data

US 2006/0151301 A1 Jul. 13, 2006

Related U.S. Application Data

(60) Provisional application No. 60/642,204, filed on Jan. 7, 2005.

(51) Int. Cl.
*B65G 23/44* (2006.01)

(52) U.S. Cl. ................................. 198/813; 198/812

(58) Field of Classification Search ............... 198/812, 198/813, 816
See application file for complete search history.

(56) References Cited

U.S. PATENT DOCUMENTS

| | | | |
|---|---|---|---|
| 3,946,861 A * | 3/1976 | Sandefur | 198/810.04 |
| 4,318,513 A | 3/1982 | Martinez | |
| 4,372,440 A * | 2/1983 | Ringis | 198/728 |
| 4,413,982 A | 11/1983 | Foster | |
| 4,425,103 A | 1/1984 | Foster | |
| 4,458,403 A | 7/1984 | Foster | |
| 4,479,734 A | 10/1984 | Rother | |
| 4,500,304 A | 2/1985 | Foster | |
| 4,538,949 A * | 9/1985 | Liet et al. | 414/24.6 |
| 4,557,707 A | 12/1985 | Thomey | |
| 4,601,683 A | 7/1986 | Foster | |
| 4,615,096 A | 10/1986 | Foster | |
| 4,624,652 A | 11/1986 | Foster | |
| 4,629,062 A * | 12/1986 | Silverthorn et al. | 198/813 |
| 4,634,408 A | 1/1987 | Foster | |
| 4,708,697 A | 11/1987 | Foster | |
| 4,887,992 A | 12/1989 | Dixon | |
| 5,174,435 A | 12/1992 | Dorner et al. | |
| 5,203,447 A | 4/1993 | Ewert | |
| 5,259,495 A | 11/1993 | Douglas | |
| 5,632,372 A * | 5/1997 | Steinbuchel et al. | 198/813 |
| 5,984,083 A | 11/1999 | Hosch et al. | |
| 6,109,427 A | 8/2000 | Hosch et al. | |
| 6,298,981 B1 | 10/2001 | Hosch et al. | |
| 6,685,009 B1 | 2/2004 | Hosch et al. | |
| 7,134,544 B1 * | 11/2006 | Kilper et al. | 198/813 |

\* cited by examiner

*Primary Examiner*—Douglas A Hess
(74) *Attorney, Agent, or Firm*—Cook, Alex, McFarron, Manzo, Cummings & Mehler, Ltd.

(57) ABSTRACT

A conveyor belt tensioner is provided for a conveyor system in which a belt is trained about first and second end rollers that are suspended for rotation between opposed side frames. A motor is provided for moving the belt with respect to the side frames. A third roller that engages the belt is provided that is mounted between the side frames for incremental movement for tensioning the belt.

9 Claims, 2 Drawing Sheets

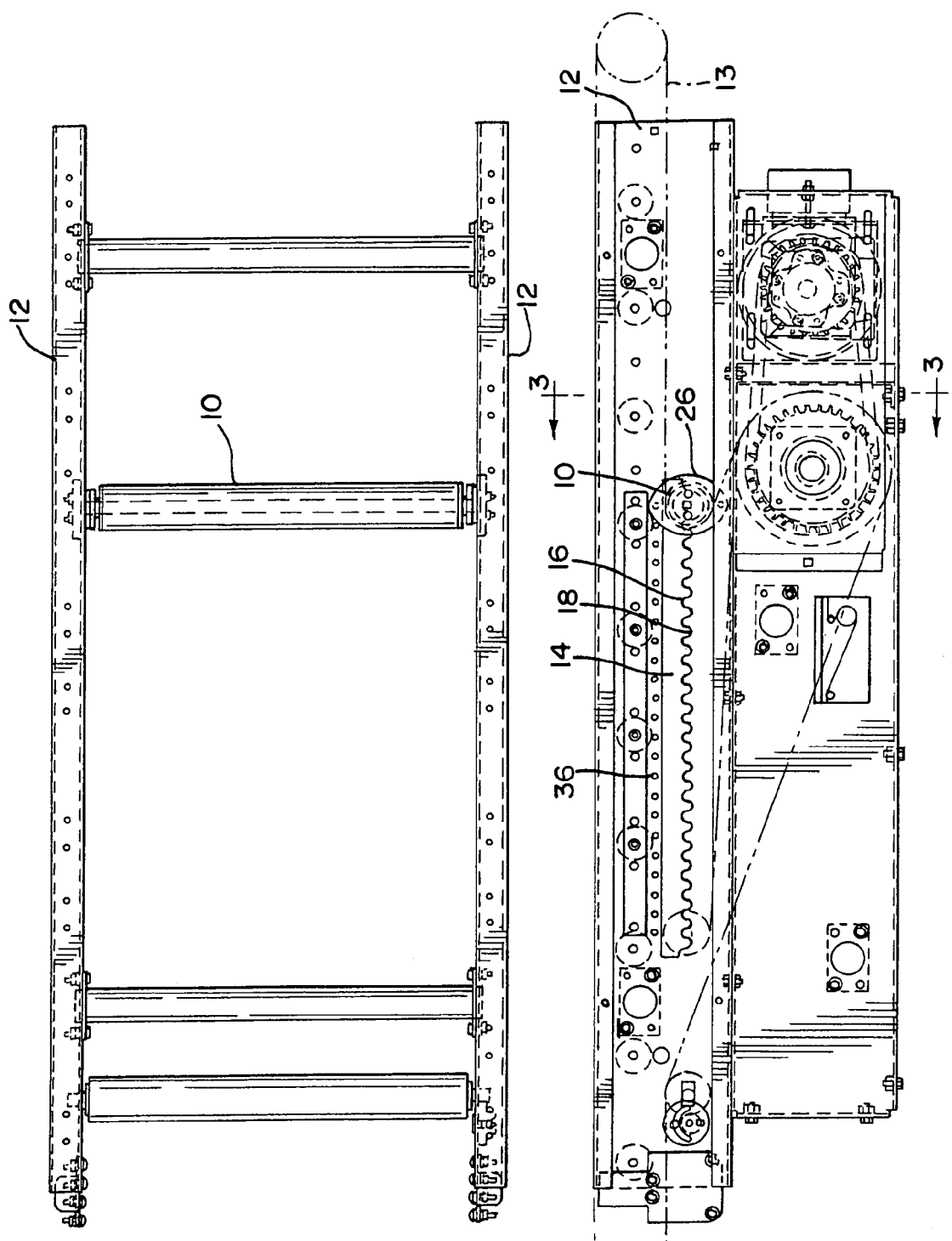

CONVEYOR BELT TENSIONER

CROSS REFERENCE TO RELATED APPLICATION

This application claims the benefit of the filing date of U.S. Provisional Application Ser. No. 60/642,204, filed Jan. 7, 2005.

BACKGROUND OF THE INVENTION

The present invention relates to a belt conveyor and, more particularly, to a belt tensioning or take up assembly for use in a belt conveyor.

In belt conveyors, in order to maintain consistent and accurate speed for the conveyor belt, it is necessary to properly tension the belt to insure that there is no slippage of the belts with respect to its drive rollers. The normal way of tensioning a belt is to wrap the belt around a moveable pulley, the pulley being moved to tension the belt by counter weights, air cylinder pressure, or a threaded shaft that is turned to move the pulley along a track. A problem with the conventional threaded shaft design is that measurements must taken both prior to and after moving the pulley to make sure that the pulley is moved the same amount with respect to both side frame members so that belt tracking is maintained. Thus, it is an object of the present invention to provide a tensioning mechanism for a belt conveyor that is easy to adjust and maintains proper tracking of the conveyor belt.

SUMMARY OF THE INVENTION

A conveyor belt tensioner that meets this object, as well as other objects which will become apparent upon reference to the following detailed description and accompanying drawings, is provided by a conveyor system in which a belt is trained about first and second end rollers that are suspended for rotation between opposed side frames. A motor is provided for moving the belt with respect to the side frames. A third roller that engages the belt is provided that is mounted between the side frames for incremental movement for tensioning the belt.

In keeping with one aspect of the invention, each side frame includes an elongated longitudinal slot having a plurality of seats spaced apart in discrete increments. The third roller comprises an axle with opposed ends with a spacer associated with each end of the axle and secured thereto so as to be interior of the side frames. A pair of spaced-apart shafts are secured to each spacer, the shafts extending through the side frames so as to be received in the seats.

In keeping with another aspect of the invention, the conveyor system further comprises a stop for limiting the vertical movement of the third roller when the shafts on the spacers are received in the U-shaped seats of the side frame. In the disclosed embodiment, the stop comprises a bumper especially co-extensive in length with the seats in the slots on the side frames. The bumper is disposed on the frame vertically above the slot so that an eccentrically-shaped plate that is received on the shafts of each spacer has an outer surface that is in close proximity with the bumper when the shafts are received in the seats.

BRIEF DESCRIPTION OF THE DRAWINGS

FIG. 1 is a side view of a conveyor belt tensioner according to the present invention.

FIG. 2 is a top view of the conveyor belt tensioner of FIG. 1, with the belt and conveyor rollers removed to show detail.

DESCRIPTION OF THE PREFERRED EMBODIMENT

Figure 3:
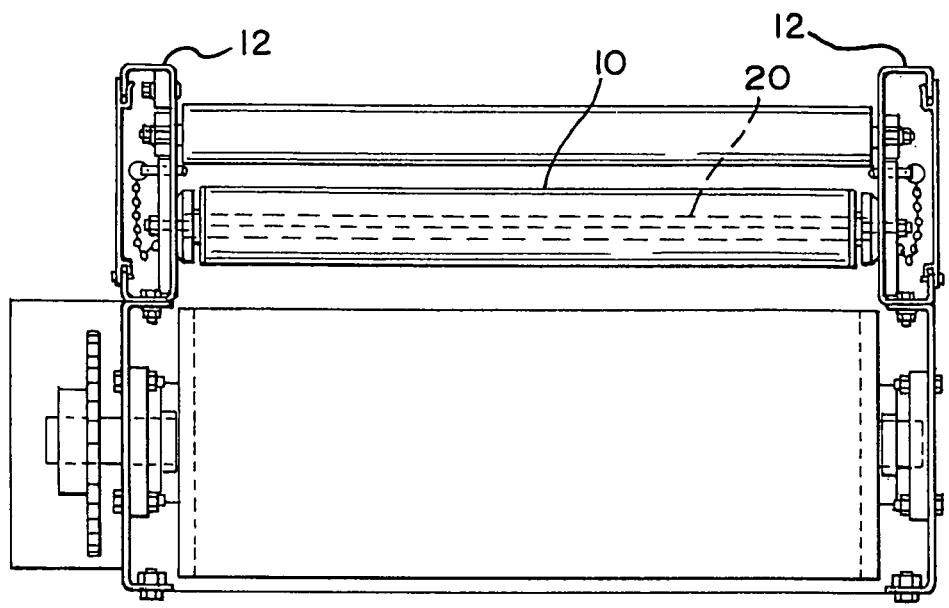
FIG. 3 is an end view of the conveyor belt tensioner of FIG. 1.

With reference to the accompanying drawings, a preferred embodiment of a tensioning mechanism is shown that insures substantially uniform movement of the tensioning roller so that tracking of the conveyor belt is maintained. To this end, a tensioning roller 10 is mounted for rotation between opposed side frame members 12 for tensioning conveyor belt 13. As best seen in FIGS. 2 and 5, the side frames 12 each have matching cutouts 14 therein that define a track having a plurality of teeth 16, with seats 18 defined between adjacent teeth 16. The tensioning roller 10 includes a stationary axle 20 the opposite ends of which are mounted to a spacer 22 interior of the opposed side frame members 12, best seen in FIG. 4. The spacer 22, in turn, includes a pair of spaced-apart stub axles 24 secured thereto by, e.g., welding. The stub axles 24 extend from the spacer 22 through the cutouts 14 in the side frame members 12 and are spaced-apart so that they rest in adjacent seats 18 in the track. The stub axles 24 carry bushings (not shown) that facilitate the locating of the stub axles 24 in the seats 18 in the track. Movement of the tensioning roller 10 along the track to adjust the tension on the belt is effected by simultaneously pivoting the spacers 22 about one of the stub axles 24 so that the other of the stub axles 24 is moved into the next adjacent seat 18 in the track.

Figure 4:
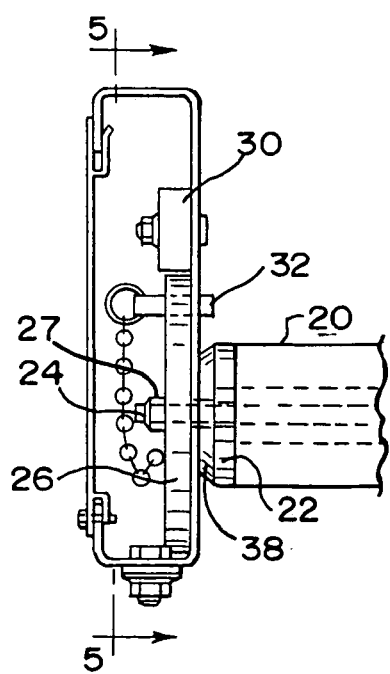
FIG. 4 is enlarged fragmentary end view taken from FIG. 3.
Figure 5:
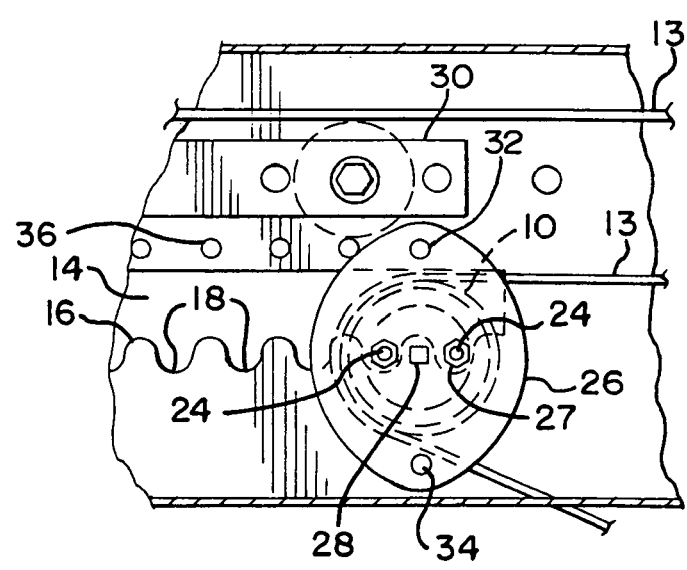
FIG. 5 is a cross sectional view taken along lines 5-5 of FIG. 4.

To effect the pivoting of the spacer 22 about one or the other of the stub axles 24, a plate 26 is mounted on the stub axles 24 by, e.g., hex nuts 27, so as to be on the exterior of the side frame 12, as best seen in FIGS. 4 and 5. The plate 26 includes an aperture 28 between the stub axles 24 for receipt of a tool that serves as a lever for pivoting the spacer 22. Preferably, the aperture comprises a ⅜ in. square hole so that a standard ⅜ in. ratchet handle can be used for the lever. However, other structures for receipt of a pivoting lever may be employed without departing from the scope of the invention. For example, the plate 26 may include a stud extending therefrom, rather then an aperture, the stud being engageable by a socket wrench.

In another aspect of the present invention, the plate 26 has an eccentric shape (as shown, a generally oblong shape) and the side frame has a stop member 30 that extends along substantially the length of the track 14 that lies in close proximity to the edge of the plate 26 when the stub axles 24 are located in the seats of the track. The stop 30 is preferably made of a UHMW plastic and is bolted to the side frame member 12. The stop 30 limits the vertical movement of the tensioning roller 10 when the stub axles 24 are seated, while still allowing pivoting the tensioning roller 10 about one or other of the stub axles 24 to adjust the tension. The oblong shape of the plate 26 insures that with each 180° of rotation of the plate 26, the edge of the plate 26 is in close proximity to the stop 30.

In another aspect of the invention, a pin 32 is provided for locking the plate 26 relative to the side frame members 12. To this end, the plate 26 has an aperture 34 adjacent each end for receipt of the pin 32 adjacent the edge of the plate 26 and along the major axis of the oblong. This aperture 34 in the plate 26 aligns with a corresponding aperture 36 in the side frame 12 when the stub axles 24 are received in the seats 18 in the track. The pin is received in the aligned holes 34, 36, thus preventing any unintended movement of the tensioning roller 10.

As best seen in FIG. 4, the spacer 22 is typically spaced away from the side frame 12 and includes an extension member 38 mounted on its face of a low friction material. The extension 38 limits the axial movement of the spacer with respect to the side frame 12 and, because it is of low friction material, does not impede pivoting of the stub axles 24 with respect to one another when adjusting the tension.

Thus, a conveyor belt tensioner has been provided that meets the objects of the present invention. While the invention has been described in terms of a preferred embodiment, there is not intent to limit it to the same. Instead, the invention is to be defined by the scope of the following claims.

What is claimed:

1. A conveyor system comprising:
opposed side frames;
first and second end rollers suspended for rotation between these side frames;
a belt trained about the end rollers for conveying articles;
a motor for moving the belt with respect to the side frames; and
a third roller mounted for longitudinal movement between the side frames, the third roller engaging the belt and being movable in discrete, predetermined increments to adjust the tension on the belt.

2. The conveyor system of claim 1 wherein each side frame includes an elongated longitudinal slot having a plurality of seats spaced apart in discreet increments, and the third roller comprises an axle with opposed ends, a spacer associated with each end of the axle and secured thereto so as to be interior of the side frames; and a pair of spaced-apart shafts secured to each spacer and extending through the side frames so as to be received in the seats on the side frames.

3. The conveyor system of claim 2 further comprising a stop for limiting vertical movement of the third roller when the shafts on the spacer are received in the seats of the side frame.

4. The conveyor system of claim 3 wherein the stop comprises a bumper substantially co-extensive in length with the seats of the slots in the side frames, the bumper being disposed on the frame vertically above the slot, and an eccentrically-shaped plate received on the shafts of each spacer whose outer surface is in close proximity with the bumper when the shafts are received in the seats.

5. The conveyor system of claim 4 wherein the plate includes a surface adapted to be engaged by a tool.

6. A conveyor system comprising:
opposed side frames, each side frame including an elongated longitudinal slot having a plurality of seats spaced apart in discrete increments;
first and second end rollers suspended for rotation between these side frames;
a belt trained about the end rollers for conveying articles;
a motor for moving the belt with respect to the side frames; and
a third roller mounted for longitudinal movement between the side frames comprising an axle with opposed ends, a spacer associated with each end of the axle and secured thereto so as to be interior of the side frames; and a pair of spaced-apart shafts secured to each spacer and extending through the side frames so as to be received in the seats on the side frames, the third roller engaging the belt and being movable in discrete increments to adjust the tension on the belt.

7. The conveyor system of claim 6 further comprising a stop for limiting vertical movement of the third roller when the shafts on the spacer are received in the seats of the side frame.

8. The conveyor system of claim 7 wherein the stop comprises a bumper substantially co-extensive in length with the seats of the slots in the side frames, the bumper being disposed on the frame vertically above the slot, and an eccentrically-shaped plate received on the shafts of each spacer whose outer surface is in close proximity with the bumper when the shafts are received in the seats.

9. The conveyor system of claim 8 wherein the plate includes a surface adapted to be engaged by a tool.

* * * * *